US006864784B1

(12) United States Patent
Loeb

(10) Patent No.: US 6,864,784 B1
(45) Date of Patent: Mar. 8, 2005

(54) VEHICLE SPEED AND SAFETY WARNING SYSTEM

(76) Inventor: Barry Loeb, 14 Jeanette Dr., Port Washington, NY (US) 11050

( * ) Notice: Subject to any disclaimer, the term of this patent is extended or adjusted under 35 U.S.C. 154(b) by 119 days.

(21) Appl. No.: 10/199,876

(22) Filed: Jul. 19, 2002

(51) Int. Cl.[7] ............................ B60Q 1/00; G08G 1/01

(52) U.S. Cl. ...................... 340/441; 340/466; 340/905; 340/936; 340/539.1; 180/171

(58) Field of Search ................................ 340/441, 936, 340/905, 466, 539.1; 180/271, 275, 170, 171

(56) References Cited

U.S. PATENT DOCUMENTS 4,100,529 A * 7/1978 Evans ........................ 340/901
4,591,823 A * 5/1986 Horvat ....................... 340/936
6,166,658 A * 12/2000 Testa ........................... 701/93
6,246,948 B1 * 6/2001 Thakker ...................... 701/93

* cited by examiner

*Primary Examiner*—Donnie L. Crosland
(74) *Attorney, Agent, or Firm*—Michael I. Kroll

(57) ABSTRACT

A vehicle speed and safety system includes a stationary transmitting device positioned on a side of a road for generating and transmitting a signal indicative of a speed limit for a respective portion of the road and a unit positioned within a vehicle. The unit includes a receiver for receiving the signal indicative of a speed limit from the transmitting device. A microprocessor analyzes the received signal to determine a posted speed limit represented by said signal, monitoring a speed of the vehicle and compares the determined speed limit to the monitored speed. A display generates an alarm signal when the microprocessor determines the monitored speed exceeds the speed limit. The signal indicative of a speed limit is preferably transmitted at a frequency unique to the speed limit whereby each frequency represents a 5 mile per hour group of speed limits.

18 Claims, 14 Drawing Sheets

VEHICLE SPEED AND SAFETY WARNING SYSTEM

BACKGROUND OF THE INVENTION

1. Field of the Invention

The present invention relates generally to vehicle safety warning systems and, more specifically, to a vehicle speed and proximity alert system wherein a posted speed limit sign or other traffic control device is equipped with a transmitter able to automatically transmit a radio signal within a predetermined range and direction to vehicles in the immediate vicinity equipped with compatible receivers which transfer the data to audible and/or visual indicators within the interior of the vehicle for alerting drivers to speed limit or other traffic controlled conditions in the area.

Additionally, the present invention provides an emergency vehicle proximity alert system wherein receiver equipped vehicles include audible and/or visual alarms for informing the driver of an approaching emergency vehicle. The present invention provides for means to manually enable or disable the frequency transmission within a law enforcement vehicle, whereby frequency transmission of location data by the law enforcement vehicle is performed independent of the activation of the emergency lights and siren.

Furthermore, the present invention provides means for a school bus, train, or other public means of transportation whereby the school bus, train or other public transportation vehicle is equipped with transmitter for transmitting location data over a specific radio frequency to vehicles within a predetermined range that are equipped with compatible receivers.

2. Description of the Prior Art

Numerous types of vehicle speed and safety warning devices have been provided in the prior art. For example. U.S. Pat. Nos. 4,100,529; 4,115,757; 4,403,208; 4,621,252; 4,917,430; 6,287,961; 6,133,855; 6,166,658; 6,166,660; 6,208,260; 6,262,673 and 5,594,432 are illustrative of such prior art. While these units may be suitable for the particular purpose to which they address, they would not be as suitable for the purposes of the present invention as heretofore described.

U.S. Pat. No. 4,115,757

Inventor: Edgar J. Evans

Issued: Jul. 11, 1978

System for warning vehicle drivers of the proximity of a road hazard. Each road hazard, moving emergency vehicles for example, have associated with them a radio frequency signal transmitter which transmits a pulse length coded signal which is unique for each hazard. Private vehicles have receivers that are responsive to the set radio frequency. When such a vehicle is within range of the road hazard warning transmitter, a light in the vehicle will flash on and off in synchronism with the pulse length coded signal. In addition, this signal drives a sound generator on and off in synchronism with the flashing light producing a coded audio signal. The Radio frequency pulse length coded signal is modulated at an audio frequency in the receiver without disturbing the pulse length code of the radio frequency signal. This then allows a human observer to hear the pulse length code as a coded audio signal.

U.S. Pat. No. 4,115,757

Inventor: Charles Stephen Blahunka

Issued: Sep. 19, 1978

A warning system suitable for use with lift trucks, or the like, which routinely transverse hazardous, blind or otherwise dangerous intersections. The system includes a transmitter, which is mounted atop the roll cage of the lift truck, and a receiver which is fixedly mounted within the corresponding zone of the intersection. The transmitter derives its primary power from the vehicle via the vehicle seat switch and radiates a suitable carrier signal through an antenna network which is integral with the transmitter housing. The carrier signal is suitably modulated or encoded by means of a secure modulation format such as FSK. The receiver is disposed at the approximate center of the intersection and includes a carrier and a modulation decoder. The decoded output of the receiver is used to control a visual indicator such as a strobe light. The output of the transmitter is adjusted by way of its antenna network and the receiver sensitivity is further adjusted to establish the desired range limits.

U.S. Pat. No. 4,403,208

Inventor: R. W. Hodgson

Issued: Sep. 6, 1983

Warning-signal producing apparatus and system for a first motor vehicle responsive to a vehicle-presence-indicating radio wave signal produced by and emitted from a second motor vehicle within a certain distance of the first motor vehicle for effectively causing the production of a corresponding warning signal within the interior of the first motor vehicle and, in one form, for correspondingly attenuating, muting, or interrupting sound emitted by any simultaneously operating entertainment apparatus within the first-mentioned-motor vehicle. In one form, the second motor vehicle (often an emergency vehicle) is provided with a radio frequency transmitter adapted to produce and transmit a vehicle-presence-indicating radio frequency signal, and each other vehicle (such as the first vehicle mentioned above) which is intended to be warned of the presence of the second vehicle, is provided with radio-frequency-signal-receiving apparatus effectively tuned so as to receive the vehicle-presence-indicating signal transmitted from the second vehicle, and is further provided with apparatus responsive thereto for effectively causing the production of some type of perceptible warning signal to alert an occupant of the first motor vehicle of the nearby presence of the second motor vehicle. Both the transmitter and the receiver, in a preferred form, are provided with effectively distance-calibrated signal limiting or gate apparatus co-operable with each other to provide for the reception by the first vehicle of the signal transmitted by the second vehicle only at or less than a precisely calibrated desired distance.

U.S. Pat. No. 4,621,252

Inventor: David G. Johns

Issued: Nov. 4, 1986

For indicating whether a vehicle can pass through a bridge, a radio transmitter is positioned adjacent the bridge to generate radio signals which are encoded with information as to the height of the bridge as presented to vehicles. A vehicle is provided with a radio receiver capable of receiving and decoding the signals from the transmitter, and comparing the height information so derived with pre-encoded information as to the height of the vehicle. A warning signal is produced in the event that the comparison indicates a danger that the vehicle cannot safely pass under the bridge. The technique is also applicable to railway crossings where a transmitter is positioned at the crossing to generate ratio signals indicative of approach of a train so that the receiver on the vehicle may provide a warning of such approach of a train on decoding the radio signals.

U.S. Pat. No. 5,594,432

Inventor: David C. Oliva

Issued: Jan. 14, 1997

A traffic information warning system for conveying traffic information from a traffic advisory site to a vehicle is disclosed. The traffic warning site comprises an emergency vehicle, a roadside hazard, or the like. The system comprises a transmitter adapted for placement at the advisory site and a receiver adapted for placement at the vehicle. The transmitter includes a first oscillator for transmitting a first carrier signal having a first carrier frequency and a second oscillator for transmitting a second carrier signal having a second carrier frequency. The first carrier frequency and the second carrier frequency are spaced apart by a predetermined frequency difference. The transmitter also includes a modulator for modulating both carrier signals with an identical modulating signal reflective of a traffic situation. The receiver includes scanning circuitry, in the form of a microprocessor, for scanning across a predetermined frequency range to detect carrier signals separated by the predetermined frequency difference and a demodulator for retrieving a first retrieved modulating signal about the first carrier signal and a second retrieved modulating signal about the second carrier signal. The receiver also uses the microprocessor to compare the first retrieved modulating signal to the second retrieved modulating signal and to determine whether the first and second retrieved modulating signal are identical. Additionally, the receiver includes an announcing device for announcing a message regarding the traffic situation.

U.S. Pat. No. 5,917,430

Inventor: Eugene F. Greneker

Issued: Jun. 29, 1999

A system for transmitting messages, such as safety hazard warning messages, to vehicles causes alerts to be generated in conventional radar detectors and more detailed messages to be provided to drivers with message capable radar receivers. The transmitted radar signal is modulated in frequency or phase or swept in frequency in different directions or at different rates to define the logical state of each bit of the message. A continuous wave (CW) maker signal may also be transmitted to assure detection by a conventional police radar detector and to allow a receiver capable of decoding messages to make adjustments that center an intermediate frequency (IF) generated from the received signal in the receiver IF passband. A message capable receiver decodes the modulated signal to communicate to the vehicle operator the contents of the transmitted message or a stored message corresponding to a transmitted code. The signal modulation is such that conventional radar detectors do not reject the signal but cause an alert to be generated, indicating to the driver the need to reduce vehicle speed to accommodate upcoming road conditions or obstacles.

U.S. Pat. No. 6,087,961

Inventor: Paul A. Markow

Issued: Jul. 11, 2000

A system for warning motorists of the presence of an emergency vehicle is provided. The system includes a transmitter adapted to be coupled to the emergency vehicle for emitting an emergency signal. The system also includes a direction finding antenna adapted to coupled to the vehicle of a motorist's vehicle, a receiver coupled to the direction finding antenna and adapted for receiving the emergency signal and producing a directional signal in response thereto, and an audio system for generating an audio playback signal which identifies the presence of the emergency vehicle as well as the relative direction between it and the motorist's vehicle.

U.S. Pat. No. 6,133,855

Inventor: Jae Bong Kim

Issued: Oct. 17, 2000

An apparatus and method for warning illegal stopping and parking car, wherein a contoller compares a position information of a vehicle provided by a GSP receiver with a position information of banned area stored in a data storage to discriminate whether the vehicle is parked or stopped according to an engine revolution and a vehicle speed detected while the vehicle is within the premise of the banned area, and to raise a warning when the vehicle is parked or stopped as a result of the discrimination, thereby assisting a driver in preventing an illegal parking or stopping in the banned area by mistake or on purpose.

U.S. Pat. No. 6,166,658

Inventor: David P. Testa

Issued: Dec. 26, 2000

A speed limit control system involving road monitors and speed limit controls in the vehicle which receive signals from road transmitters installed in illuminated signs such as highway signs, traffic lights, rural signs, shopping mall signs, and residential street signs that can automatically lower and restrain the vehicle to the posted maximum MPH speed limit.

U.S. Pat. No. 6,166,660

Inventor: Frank Grenier

Issued: Dec. 26, 2000

A driveway alarm system for disposing along a driveway of a home or business for warning an occupant of the premise about an object, including a vehicle, on the driveway, or for warning a driver of a vehicle about an overhanging object in the driveway. The overhead warning and driveway alarm system includes a solar panel, a battery, a magnetic field generator, a driveway probe and a transmitter. The solar panel charges the battery which powers the driveway probe and the transmitter. The driveway probe creates a magnetic field. When the magnetic field is disturbed, the transmitter is activated, sending a radio signal to the receiver. In operation, when a car or other object disturbs the magnetic field proximate the driveway probe sensor, the transmitter provides a radio alert signal to the indoor subsystem. The overhead warning and driveway alarm system also includes a radio signal receiver, a line carrier current transformer, and line carrier current triggered audio devices such as chiming loudspeakers which are powered by standard 110 volt household AC outlets. The receiver activates the line carrier current transformer causing all audio devices plugged into 110 volt outlets to emit a chime sound for warning the occupant of a premise about the object on the driveway, or for warning the driver of the vehicle about the overhanging object in the driveway.

U.S. Pat. No. 6,208,260

Inventor: Jill West

Issued: Mar. 27, 2001

A hazard warning system for warning personnel of potential peril within a specific warning zone, the system including a variable, ultrasonic, and/or infra-red directional transmitter directed to focus on and around a specific hazard and a receiver having both audio and visual warning indicators worn by the worker. Workers outside the warning zone or field not receiving the warning are therefore not immunized by visual and audible signals which are not pertinent to their safety. The warning system further utilizes distance measuring circuitry to automatically determine the distance from the transmitter located on an evaluated crane boom to ground or deck. The distance measurement is then micro processed to maintain a prescribed infrared field around a suspended object regardless of the boom height. A further embodiment utilizes the technology for a portable signal generator apparatus for attachment to a moving load or vehicle, the warning zone or field may be directed and varied in size and range.

U.S. Pat. No. 6,262,673

Inventor: Charleen L. Kalina

Issued: Jul. 17, 2001

A roadway warning system includes a visual traffic directing device that is at a first status for a first status time period and that is at a second status for a second status time period. A transmitter transmits a signal for a first signal time period, and a receiver mounted on the vehicle receives the signal. An indicator connected to the receiver indicates that the visual traffic directing device is either at the first status or is about to change to the first status so that a driver of the vehicle is warned of the present or future status of the visual traffic directing device. A method of warning a driver of a vehicle about the status of a visual traffic directing device includes transmitting a directional radio signal beginning at a predetermined time before the traffic directing device changes to a status, receiving the signal if the vehicle is approaching the traffic directing device from a first direction, and indicating that the visual traffic directing device is at the status or that the visual traffic directing device is about to change to the status by an audio message that is capable of being heard by the driver of the vehicle so that a driver of the vehicle is warned of the present or future status of the visual traffic directing device.

SUMMARY OF THE PRESENT INVENTION

The present invention relates generally to vehicle safety warning systems and, more specifically, to a vehicle speed and proximity alert system wherein a posted speed limit sign is equipped with a transmitter able to automatically transmit a radio signal within a predetermined range and direction to vehicles in the immediate vicinity equipped with compatible receivers. The receivers transfer the data to display(s) within the interior of the vehicle thereby providing audible and/or visual indicators alerting drivers to speed limit conditions in the area.

A primary object of the present invention is to provide a vehicle speed alert system for cautioning drivers by transmitting posted speed limit data over a specific radio frequency to vehicles within a predetermined range that are equipped with compatible receivers.

Another object of the present invention is to provide a vehicle speed alert system wherein receiver equipped vehicles include audible and/or visual alarms for informing the driver of unsafe road conditions.

Another object of the present invention is to provide a vehicle speed alert system wherein receiver equipped vehicles includes audible and/or visual alarms for informing the driver of posted speed limits and travel at excessive speeds.

Another object of the present invention is to provide an emergency vehicle proximity alert system that will reduce collisions between responding emergency vehicles and other vehicles whereby emergency vehicles are equipped with transmitters for transmitting a signal indicating the emergency vehicle is in the immediate area over a specific radio frequency to vehicles within a predetermined range that are equipped with compatible receivers thereby alerting drivers as to the approaching emergency vehicle.

Another object of the present invention is to provide an emergency vehicle proximity alert system wherein receiver equipped vehicles include audible and/or visual alarms for informing the driver of an approaching emergency vehicle.

A still further object of the present invention is to provide a school bus proximity alert system able to reduce the possibility of accidents with school buses whereby school busses are equipped with transmitters for transmitting location data over a specific radio frequency to vehicles within a predetermined range that are equipped with compatible receivers.

Yet another object of the present invention is to be able to record the actual speed of a vehicle versus a posted speed limit.

An even further object of the present invention is to record the actual speed of a vehicle versus a posted speed limit thereby allowing employers to monitor employees for safe operation of company vehicles.

Yet another object of the present invention is to record the actual speed of a vehicle versus a posted speed limit thereby aiding in the teaching of safe driving.

Another object of the present invention is to record the actual speed of a vehicle for use in collaboration with law enforcement speed detectors in adjudicating speeding offenses.

Another object of the present invention is to transmit and record the vehicle identification number (VIN) so that it can be used in collaboration with law enforcement.

Yet another object of the present invention is to provide an emergency vehicle proximity alert system wherein the emergency vehicle transmitter is hardwired into the lights and/or sirens so as to automatically activate when the emergency vehicle is in response mode and be deactivated when the lights and/or sirens are turned off.

Another object of the present invention is to be able to manually enable or disable the frequency transmission within a law enforcement vehicle, whereby frequency transmission of location data by the law enforcement vehicle is performed independent of the activation of the emergency lights and siren.

Yet another object of the present invention is to provide a school bus proximity alert system wherein the school bus transmitter is hardwired into the caution lights and/or bus mounted stop sign so as to automatically activate when the school bus is in stopping mode and be deactivated when the lights are turned off.

Still yet another object of the present invention is to provide an emergency vehicle proximity alert system wherein the receiver in a receiver equipped vehicle is enabled while the vehicle is running and disabled when the engine is turned off.

Additional objects of the present invention will appear as the description proceeds.

In the system of the present invention, transmitters secured to traffic and speed limit signs emit signals at predetermined frequencies for each posted speed limit. A unique frequency is provided for each 5 mph interval. These signals are received by a receiver within equipped vehicles. The receiver receives the signal and relays the data signal to a microprocessor within the vehicle. The microprocessor processes the signal to determine if the vehicle's current speed is exceeding the current posted speed limit. If the posted speed limit is exceeded, the microprocessor sends a signal to audible and/or visual indicators to alert the driver.

A data recording device may be connected to the microprocessor for recording data indicative of the current speed of the vehicle as well as the posted speed over a set interval of time. The recording device is activated when the vehicle transmission is set in a drive position. The actual speed and the posted speed limit is recorded, the posted speed limit remains the same until a different frequency has been received. This data is stored on a removable recording medium that can be accessed by a computer.

In addition to speed detection, the present invention is able to alert drivers to emergency or hazardous road conditions. When equipped with a transmitter predefined with a unique frequency, an emergency vehicle, when in response mode, transmits a radio signal to vehicles in a predetermined vicinity of the vehicle that are equipped with compatible receivers. The emergency vehicle is equipped with a transmitter wired into the vehicle's emergency lights and/or sirens to enable said transmitter. Thus, the transmitter begins transmitting a signal upon activation of the vehicle's emergency lights and/or sirens to vehicles in the immediate vicinity that are equipped with compatible receivers. The data is provided to displays within the vehicle interior for providing audible and/or visual signals to alert drivers to the presence of an emergency vehicle in the immediate area.

Furthermore, when equipped with a transmitter predefined with a unique frequency, a school bus, when stopping for pickup or discharge of passengers, will transmit a radio signal to vehicles equipped with compatible receivers in the immediate vicinity. The school bus is equipped with a transmitter wired into the vehicle's flashing lights and/or bus mounted stop sign to enable said transmitter to automatically operate therewith when in pick up or drop off mode and transmit a radio signal to vehicles equipped with compatible receivers in the immediate vicinity. The data is provided to a display within the vehicle providing audible and/or visual signals alerting drivers to the presence of the school bus.

Still further, when equipped with a transmitter for transmitting a signal at a predefined unique frequency, railroad trains transmit a radio signal to vehicles equipped with compatible receivers in the immediate vicinity. The data is provided to displays within the vehicle for producing audible and/or visual signals alerting drivers to the approaching railroad trains.

The present invention may be factory installed during manufacture or installed as an aftermarket option to allow as many vehicles as possible to be a part of the vehicle speed and safety warning system. The present invention system will save lives not only by reducing speed on the roads, but alerting drivers to hazardous and emergency situations.

The present invention overcomes the shortcomings of the prior art by providing an emergency vehicle proximity alert device with traffic management capabilities having a transmitter located on the emergency vehicle that is automatically enabled when the sirens and/or lights are on and the vehicle is in a response mode. Receivers located within vehicles relay audible and/or visual alarms and a display to inform drivers that an emergency vehicle is approaching.

To the accomplishment of the above and related objects, this invention may be embodies in the form illustrated in the accompanying drawings, attention being called to the fact, however, that the drawings are illustrative only, and that changes may be made in the specific construction illustrated and described within the appended claims.

BRIEF DESCRIPTION OF THE DRAWING FIGURES

In order that the invention may be more fully understood, it will now be described, by way of example, with reference to the accompanying drawing in which.

Figure 13:
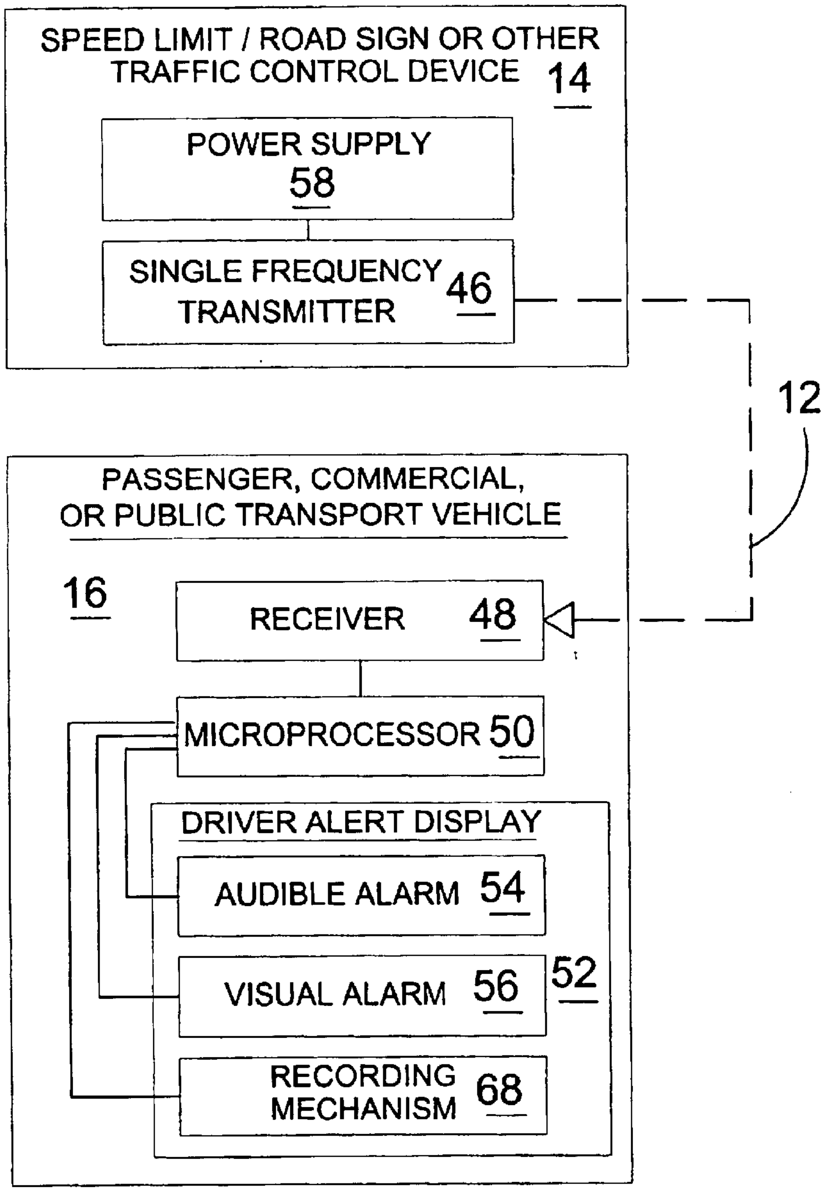
Figure 14:
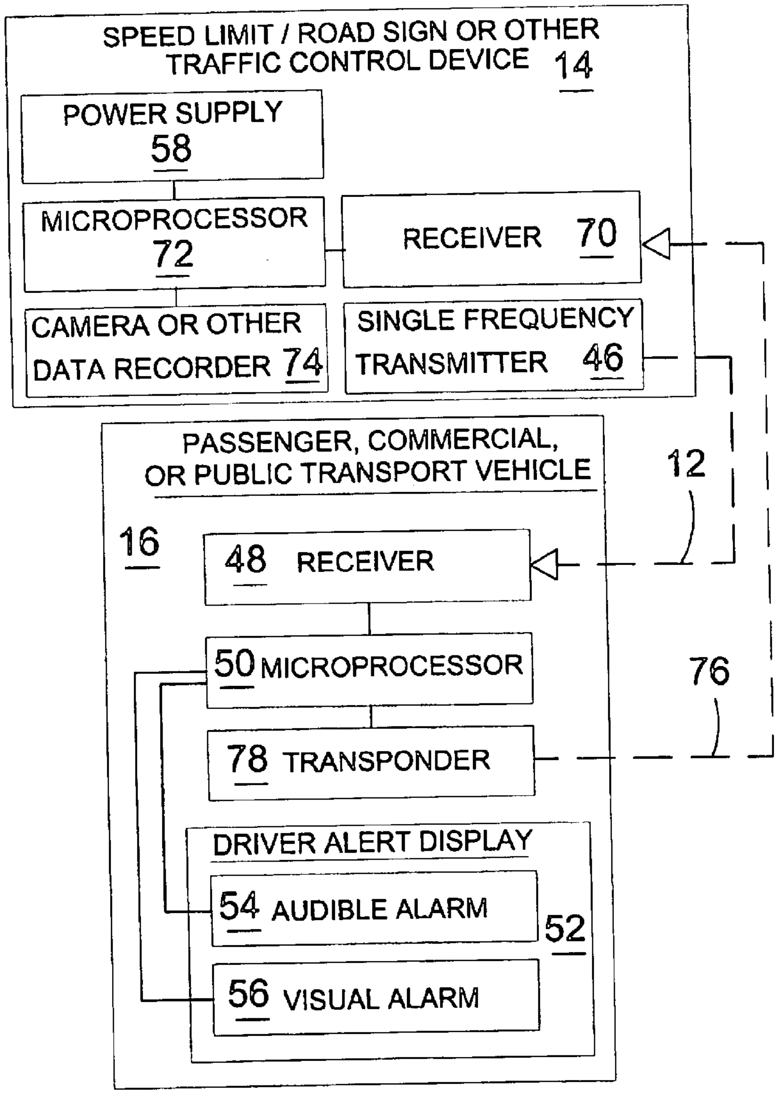

FIG. 13 is a block diagram showing a road sign transmitter transmitting warning data to the receiver and recording mechanism in accordance with the vehicle speed and safety warning system of the present invention; and FIG. 14 is a block diagram showing a road sign transmitter transmitting warning data to the receiver and recording mechanism and receiving and storing vehicular data from a transponder located in the vehicle in accordance with the vehicle speed and safety warning system of the present invention.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate Vehicle Speed and Safety Warning System of the present invention. With regard to the reference numerals used, the following numbering is used throughout the various drawing figures.

10 vehicle speed and safety warning system
12 speed warning signal
14 sign transmitter
16 vehicle
18 road surface
20 vehicle warning system display
22 dashboard
24 Emergency Vehicle
26 emergency alert signal
28 law enforcement vehicle
30 train alert signal
32 train
34 school bus
36 bus alert signal
38 a first location
40 a second location
42 a third location
43 processor
44 windshield
45 power source
46 Single Frequency Transmitter
48 receiver
50 microprocessor
52 Alert Unit
54 audible alert
56 visual alert
58 Power supply
60 a first switch
62 a second switch
63 transmission defeat switch
64 warning lights
65 bus mounted stop sign
66 a computer
68 recording mechanism
70 sign receiver
72 sign microprocessor
74 camera/data recorder
76 transponder signal
78 transponder

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 14 illustrate the vehicle speed and safety warning system of the present invention indicated generally by the numeral 10.

Figure 1:
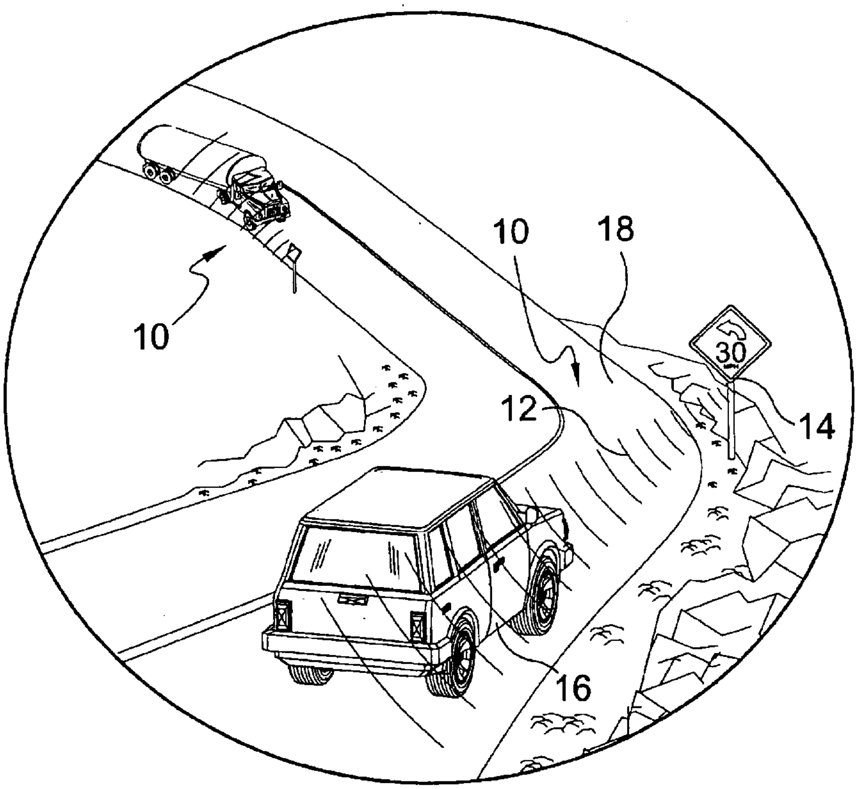
FIG. 1 is an illustrative view of the vehicle speed and safety warning system of the present invention used in conjunction with a posted traffic sign.

FIG. 1 is an illustrative view of the vehicle speed and safety warning system 10 of the present invention showing use in conjunction with a traffic sign posted at a sharp bend in a road. As vehicles 16 approach cautionary road signs 14, road signs 14 emit a predetermined speed warning signal 12 to reduce speed for an oncoming bend in the road. The road sign may continuously transmit a signal. Alternatively, the road sign may be connected to a device able to determine when a vehicle is within a certain distance therefrom and transmit a signal upon determining a vehicle is within the certain distance. The road signs 14 are equipped with a transmitter 46 that emits a signal at a predetermined frequency allowing a vehicle 16 equipped with a receiver 48 to be alerted to the posted speed limit. In response to the alerting of the driver, the driver is able to determine a safe driving speed. The system is also able to alert the driver if the posted speed limit is being exceeded. The transmitters may be powered by means of solar, batteries, or line power. In response to changes in road conditions, the posted speed limit may change. Thus, the signal transmitted by the transmitter will indicate such a change and thus alert the driver to any extreme conditions.

Figure 2:
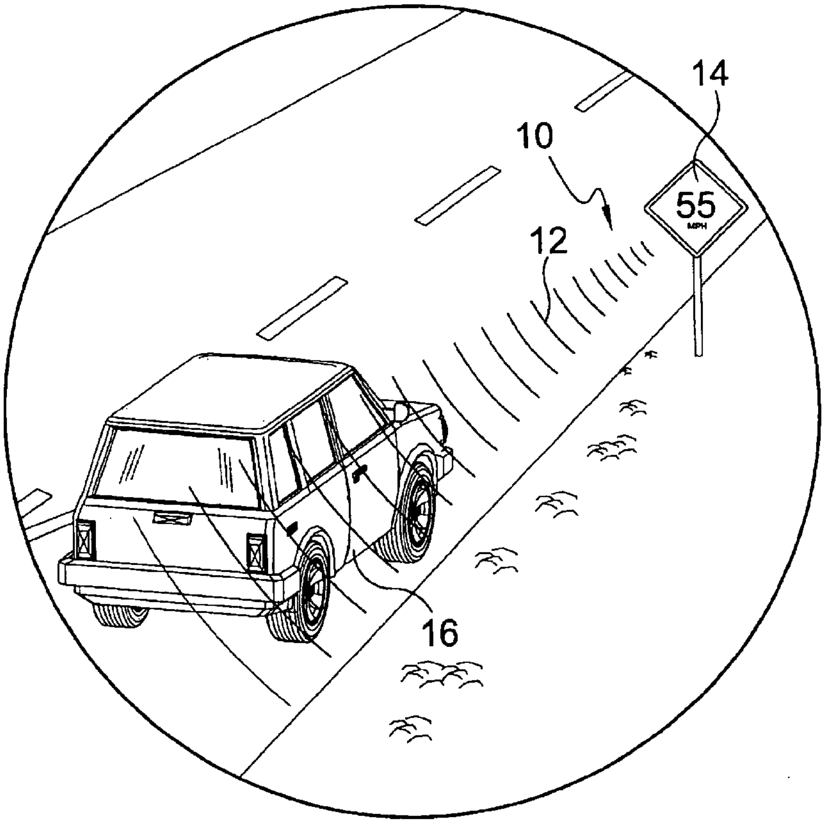
FIG. 2 is an illustrative view of the vehicle speed and safety warning system of the present invention used in conjunction with another posted traffic sign.
Figure 9:
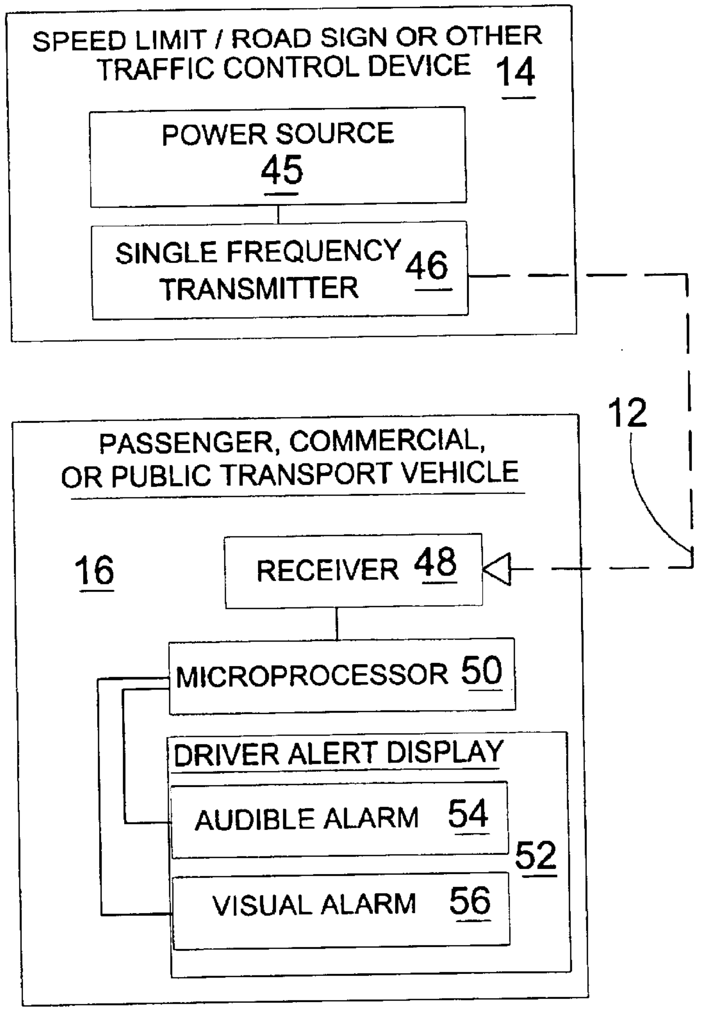
FIG. 9 is a block diagram showing a road sign transmitter transmitting warning data to the receiver in accordance with the vehicle speed and safety warning system of the present invention.

FIG. 2 is an illustrative view of the vehicle speed and safety warning system 10 of the present invention showing use in conjunction with a traffic sign posted along a straight stretch of roadway. The vehicle 16 is shown approaching a road sign 14 posting the speed limit for the present portion of the road. The road sign 14 is equipped with a transmitter 46, as shown in FIG. 9. The transmitter 46 emits a signal having a predefined frequency. The signal is indicative of the posted speed limit. The speed limit road signs may transmit a different frequency for each posted 5 mph interval allowing the vehicle's receiver to decipher the appropriate speed. In such instances, the receiver would be tuned to receive each possible transmitted frequency at any time or the receiver may scan a range of frequencies until a signal is received. The frequency of the received signal is then determined and thus the posted speed limit is detected. Alternatively, the transmitter may transmit a data signal indicative of the posted speed limit that is analyzed upon receipt to determine the posted speed limit. The transmitter 46 of the road sign 14 transmits a speed warning signal that is received by a receiver 48 located within the vehicle 16 upon nearing the traffic sign. The speed warning signal 12, once received by the receiver 48 alerts the occupants of the vehicle 16 as to the posted speed limit and also if the vehicle 16 is exceeding the area speed limit. In response to changes in road conditions, the posted speed limit may change. Thus, the signal transmitted by the transmitter will indicate such a change and thus alert the driver to any extreme conditions. The change is indicated by a change in the frequency at which the signal is transmitted or a change in the data signal to indicate the new speed limit.

Figure 3:
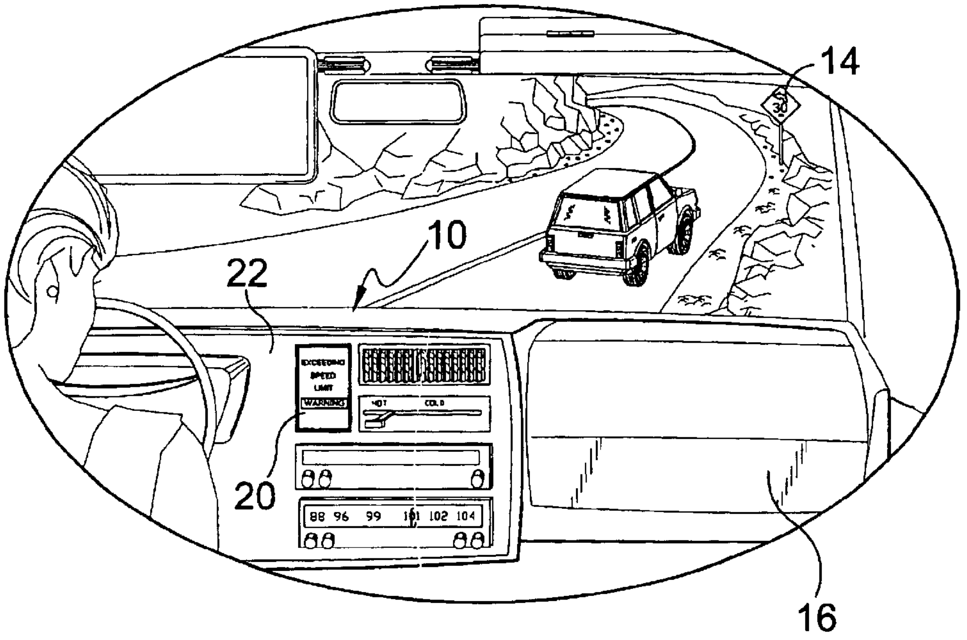
FIG. 3 is an illustrative view within a vehicle equipped with the vehicle speed and safety warning system of the present invention.

FIG. 3 is an illustrative view of the inside of a vehicle including the vehicle speed and safety warning system of the present invention. This figure shows the visual warning device used in conjunction with a posted traffic sign. A vehicle 16 is equipped with a visual warning system display 20. The visual warning display 20 is shown factory installed in the vehicle 16 and is located on the dashboard 22 of the vehicle 16. This location allows the user to easily see the visual alert emitted by the vehicle speed and safety warning system 10. A signal indicative of the posted speed limit is received by the receiver 48 from the transmitter 46 located on a road sign 14. The system then analyzes the received signal and provides a visual alert based upon an analysis of the received signal and the current speed of the vehicle 16. Once the receiver 48 identifies the transmitted frequency of the speed limit, it tunes to that frequency for receipt of the signal. A microprocessor 50 as shown in FIG. 9 within the vehicle 16 determines the current speed of the vehicle 16 and compares it to the determined posted speed limit. Alternatively, a data signal indicative of the posted speed limit is transmitted by the transmitter at a predetermined frequency and analyzed by the microprocessor upon receipt to determine the posted speed limit. If the vehicle 16 is exceeding the posted area speed limit as transmitted from the road sign 14, a visual and/or or audio warning is provided on the visual warning system display 20 to alert the occupants of the vehicle.

Figure 4:
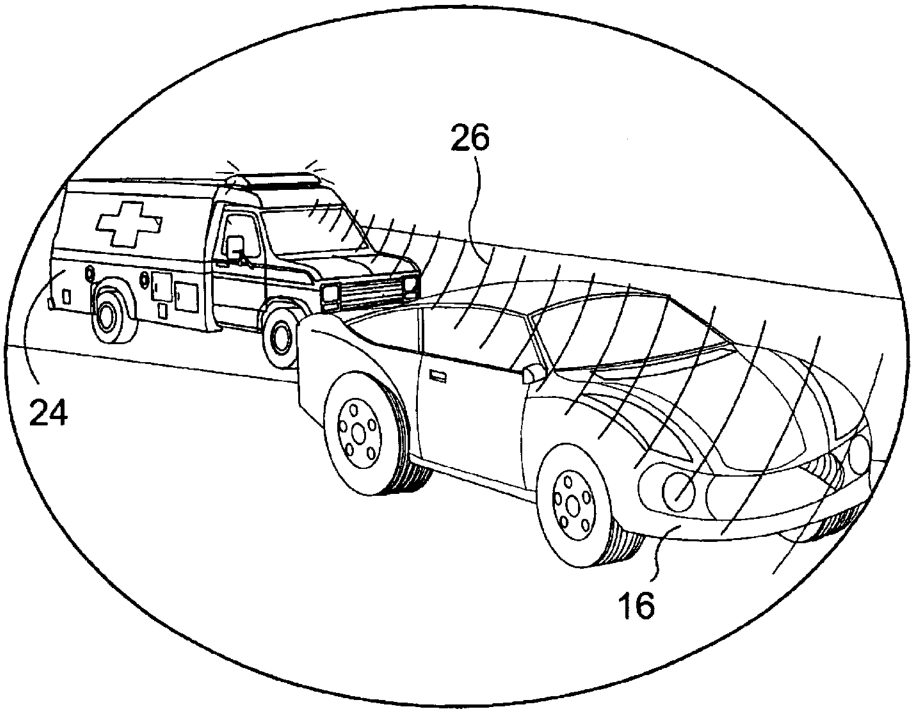
FIG. 4 is an illustrative view of the vehicle speed and safety warning system of the present invention used in conjunction with an emergency vehicle.

FIG. 4 is an illustrative view of the vehicle speed and safety warning system 10 of the present invention showing use with an emergency vehicle. The vehicle warning system 10 provides for a unique frequency for transmission of signals 26 by emergency vehicles 24. This emergency warning signal 26 indicates the presence of an emergency warning vehicle in the immediate area and thus allows for improved awareness of the presence of an emergency vehicle 24 on the road. The vehicle 16 equipped with the receiver 48, receives the emergency warning signal 26 that is transmitted by the emergency vehicle 24. Upon receiving the signal 26, the microprocessor 50 of the vehicle warning system 10 activates a visual/and or audible signal. The visual and/or audible signal alerts the driver as to the presence of the emergency vehicle 24. This allows for the vehicle 16 to clear the path that the emergency vehicle 24 is on thereby allowing the emergency vehicle 24 to reach its destination more quickly and safely.

Figure 5:
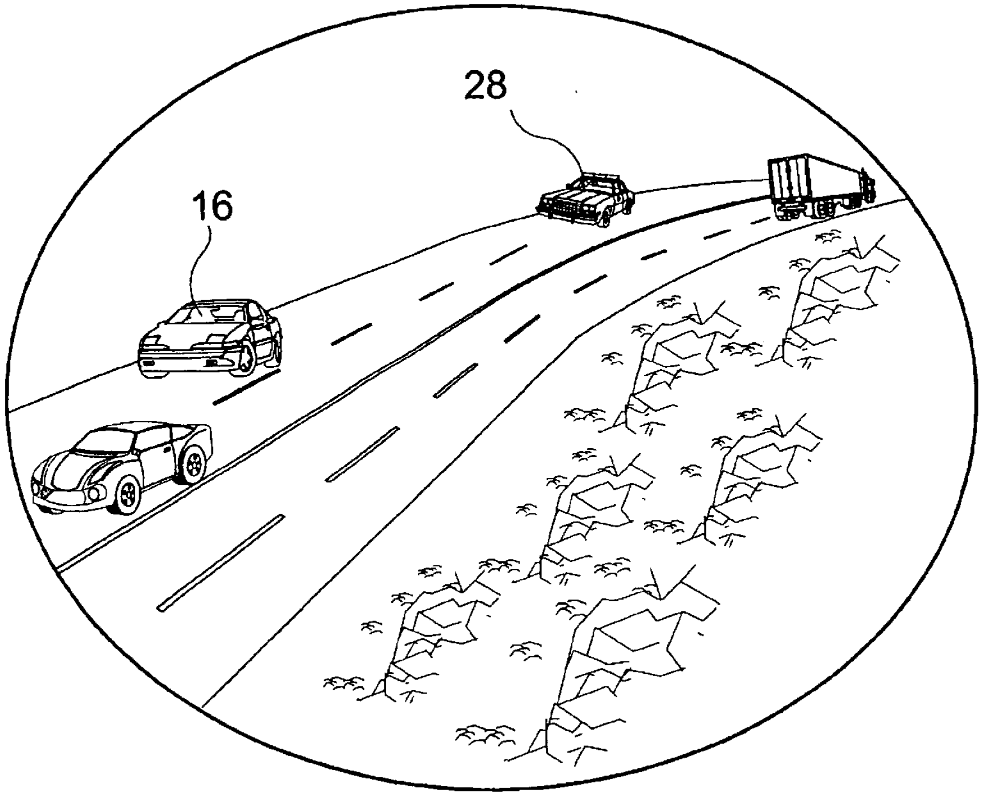
FIG. 5 is an illustrative view of the vehicle speed and safety warning system of the present invention used in conjunction with a law enforcement vehicle.

FIG. 5 is an illustrative view of the vehicle speed and safety warning system 10 of the present invention showing use in conjunction with a law enforcement vehicle 28. The vehicle warning system 10 provides for a unique frequency for transmission of signals by law enforcement vehicles 28. This emergency warning signal 26 indicates the presence of a law enforcement vehicle 28 in the immediate area and thus allows for improved awareness of the presence of the law enforcement vehicle 28 on the road. The vehicle 16 equipped with the receiver 48, receives the signal transmitted by the law enforcement vehicle 28. Upon receiving the signal 26, the microprocessor 50 of the vehicle warning system 10 activates a visual/and or audible signal. The visual and/or audible signal alerts the driver as to the presence of the law enforcement vehicle 28. This allows for the vehicle 16 to clear the path that the law enforcement vehicle 28 is on thereby allowing the law enforcement vehicle 28 to reach its destination more quickly and safely.

The vehicle warning system 10 allows for a law enforcement vehicle 28 to turn off its warning signal capability. The law enforcement vehicle 28 includes a manual defeat switch 62 to enable or disable the transmission of the frequency to other vehicles 16 on the road. In the event that a law enforcement vehicle 28 is pursuing a vehicle 16 on the road or monitoring the speed of vehicles on the road to detect speeding vehicles, the transmitter 46 can be disabled to allow the law enforcement vehicle 28 to travel undetected by the vehicle warning systems 10 located in other vehicles 16 on the road.

Figure 6:
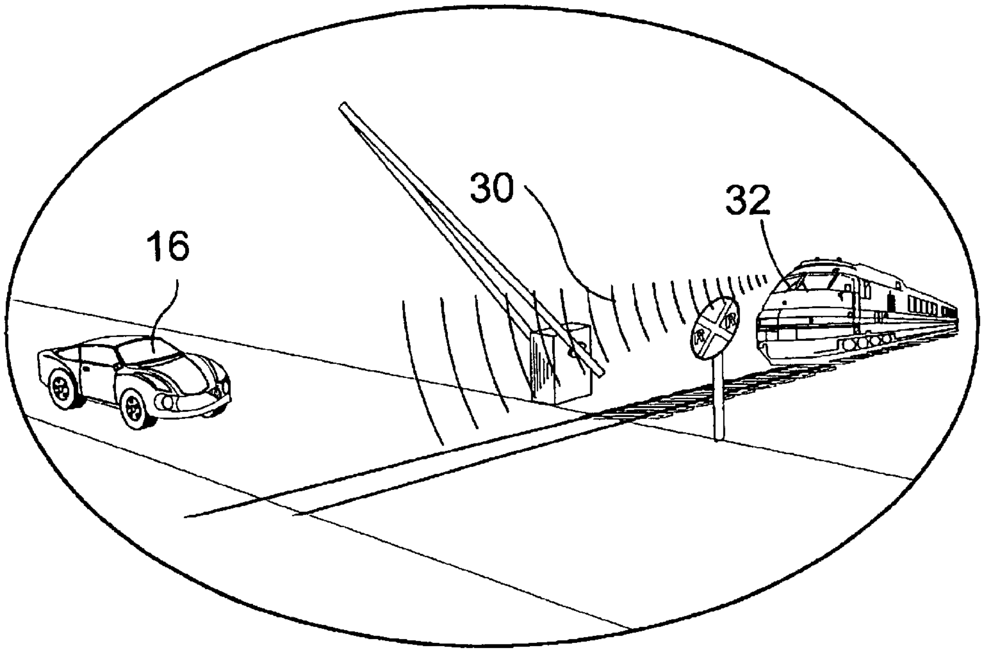
FIG. 6 is an illustrative view of the vehicle speed and safety warning system of the present invention used in conjunction with a railroad train.

FIG. 6 is an illustrative view of the vehicle speed and safety warning system of the present invention shown being used in conjunction with a railroad train. The vehicle warning system 10 provides for a unique frequency for transmission of signals 30 by a train to alert vehicles in the immediate area as to its approach. The signal 30 is received by the vehicle warning system 10 of a vehicle 16. Upon receipt, the microprocessor 50 of the warning system 10 analyzes the signal to determine that it has been transmitted by a train and activates a visual 56 and or audible 54 alarm (see FIGS. 9 and 10) alerting the user that a train is present. The vehicle warning system 10 alerts users to the presence of a train and is especially helpful in the event that a barrier gate, the normal warning method employed at railroad crossings, were to malfunction or is not present. The unique train alert signal 30 notifies the driver of a vehicle 16 to stop at the railroad crossing thereby preventing or at least minimizing the possibility of the occurrence of tragic accidents.

Figure 7:
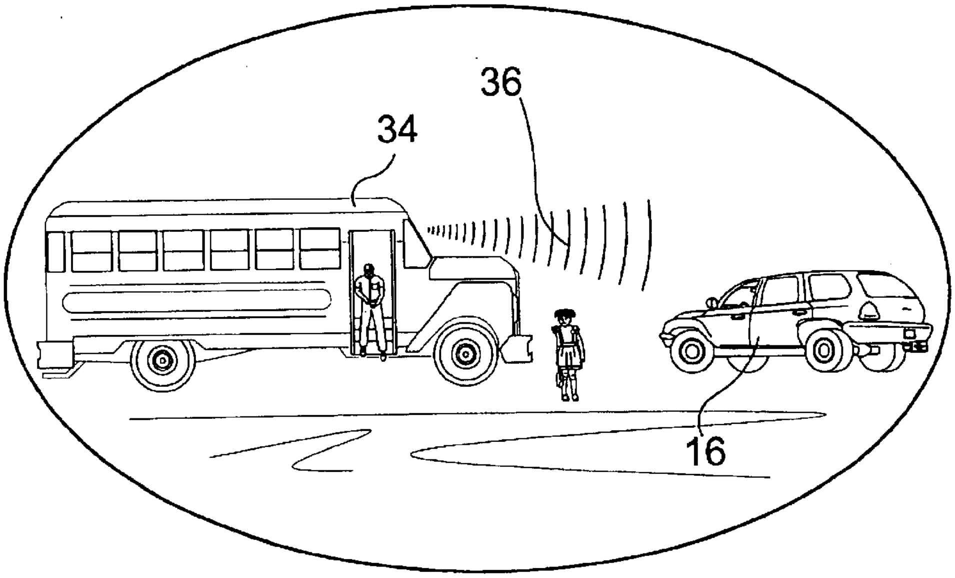
FIG. 7 is an illustrative view of the vehicle speed and safety warning system of the present invention used in conjunction with a school bus.

FIG. 7 is an illustrative view of the vehicle speed and safety warning system of the present invention shown being used in conjunction with a school bus 34. The vehicle warning system 10 provides for a unique frequency for transmission of signals 36 by the bus 34. The bus alert signal 36 transmitted from a school bus 34 allows for improved awareness of the presence of the school bus and the possibility of children in the area. The bus alert signal 36 is preferably automatically transmitted upon activation of the flashing lights and/or bus mounted stop signs indicating the bus has stopped in order to pickup or discharge children and/or passengers. Upon activation, the transmitter 46 is activated and emits the unique bus alert signal 36. This signal is received by the receiver 48 located in the vehicle 16 when the vehicle is within a predetermined distance from the bus 34. Upon receipt of the bus alert signal 36 by the receiver 48, the receiver 48 signals the microprocessor 50 to activate the alert unit 52. Once activated, the alert unit 52 activates at least one of the audible alert 54 and visual alert 56. The audible alert 54 and the visual alert 56 signify to the user in the vehicle 16 that a school bus 34 is present.

Figure 8:
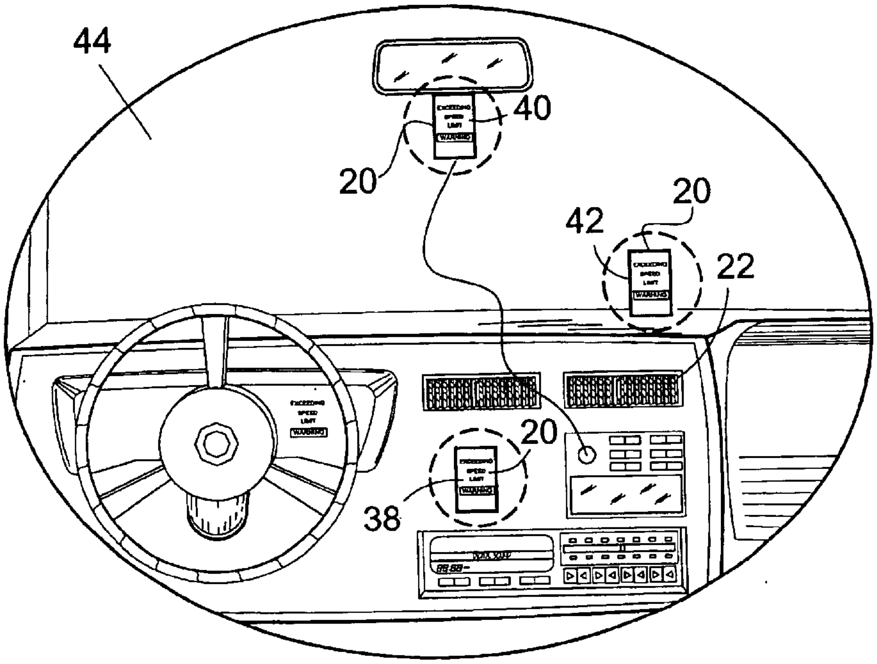
FIG. 8 is an illustrative view of an interior of a vehicle including the vehicle speed and safety warning system of the present invention showing mounting options for the display.

FIG. 8 is an illustrative view of an inside of a vehicle showing the vehicle warning system display 20 of the vehicle speed and safety warning system of the present invention mounted in a number of possible locations. The vehicle warning system display 20 may be located in a first location 38 installed within the dashboard 22 of the vehicle. When mounted in this position, the vehicle warning system display 22 is generally installed in the factory upon manufacturing of the vehicle. The vehicle warning system display 20 can also be mounted to preexisting cars in a second location 40 located under the rearview mirror 41 or in a third location 42 located on the windshield 44. The vehicle warning system display 20 located in at least one of a first, second or third locations allows for viewing by the user without obstructing the view thereby not affecting the ability of the driver to operate the vehicle. The vehicle warning system display 20 can get power from the vehicle battery, or the vehicle warning system display 20 can be adapted to receive power from the 12v DC cigarette lighter or other available 12 volt DC power outlets.

FIG. 9 is a block diagram of the vehicle speed and safety warning system of the present invention. This figure shows the interaction of the vehicle mounted receiver and display with a road sign. The road sign 14 includes a transmitter 46 for transmitting a unique speed warning signal 12. The transmitted is connected to both a processor 43 and a power source 45. The power source provides power to operate the processor 43 and for transmitting the speed warning signal 12. The processor 43 controls the transmission of the signal by the transmitter 44. This signal is received by the receiver 48 of the vehicle warning system 10 located in the vehicle 16. The speed warning signal 12 is transmitted at a different frequency for each speed limit. Alternatively, the speed warning signal 12 may be a data signal whereby the data signal is indicative of the posted speed limit. Upon receiving the speed warning signal 12, the receiver 48 communicates with the microprocessor 50. The microprocessor 50 analyzes the received signal to determine the posted speed limit and monitors the speed of the vehicle 16. If the microprocessor 50 determines the speed of the vehicle 16 is greater than the posted speed as denoted by the unique speed warning signal 12, the microprocessor 50 then signals the alert unit 52. The alert unit 52 is comprised of an audible alert 54 and/or a visual alert 56. Once activated, the audible alert 54 and/or the visual alert 56 alerts the user in the vehicle that the speed of the vehicle 16 is greater than the posted area speed limit. The user can then slow down the appropriate speed whereby the audible 54 and/or visual alert 56 will deactivate. The microprocessor 50 includes a memory on which the speeds of the vehicle as well as the posted speed limit indicated by the received signal may be stored at predetermined intervals to monitor the speed of the vehicle and whether the vehicle was traveling at speeds over the speed limit. The present invention increases safety on the road by providing means to alert users who do not realize their speed has increased past the allowed limit.

Figure 10:
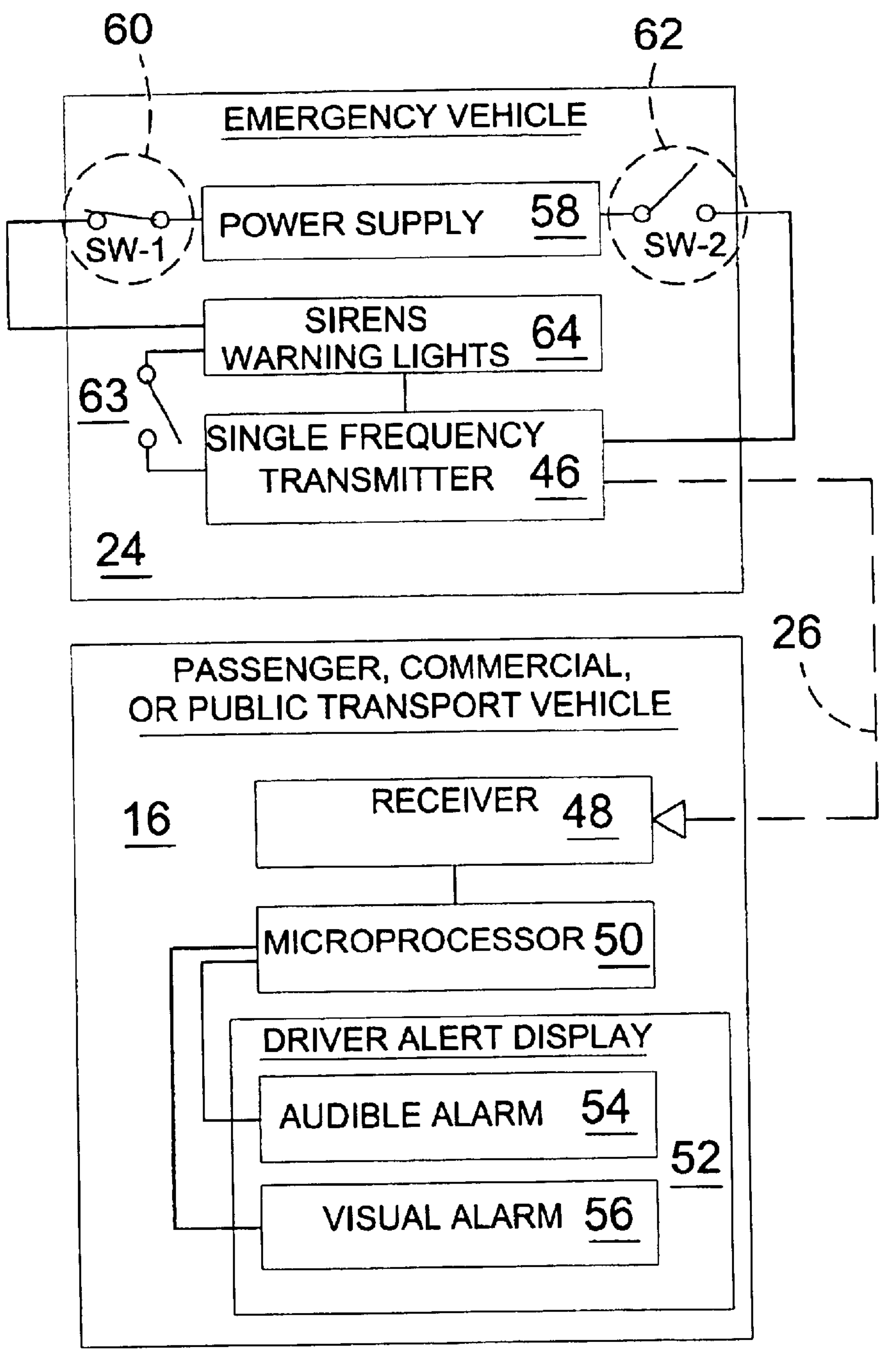
FIG. 10 is a block diagram showing an emergency vehicle transmitter transmitting warning data to the receiver in accordance with the vehicle speed and safety warning system of the present invention.

FIG. 10 is a block diagram of the vehicle speed and safety warning system of the present invention. This figure shows the interaction of the vehicle mounted receiver and display with a transmitter in an emergency or law enforcement vehicle. The emergency vehicle 24 includes a power supply 58. The power supply 58 is connected to the sirens 64 of the vehicle by a first switch 60. The power supply 58 is also connected to the transmitter 46 by a second switch 62. The sirens 64 are also connected to the transmitter 46. When the first switch 60 is in the open position, the sirens 64 are not activated. Activation of the first switch 60 into the closed position activates the sirens 64. The activation of the sirens 64 connects the power supply to the transmitter 46. Upon connection of the power supply to the transmitter 46, the transmitter is caused to transmit the emergency warning signal 26. Alternatively, the second switch 62 may be manually activated to be placed in the closed position. Upon activation of the second switch, the transmitter 46 is connected to the power supply 58 and caused to transmit the emergency warning signal 26.

The emergency warning signal 26 is received by the receiver 48 of the vehicle warning system 10 located in the vehicle 16. Upon receiving the emergency warning signal 26, the receiver 48 communicates with the microprocessor 50. The microprocessor 50 analyzes the received signal to determine the approach of the emergency vehicle. The microprocessor 50 then signals the alert unit 52. The alert unit 52 is comprised of an audible alert 54 and/or a visual alert 56. Once activated the audible alert 54 and/or the visual alert 56 inform the user in the vehicle that there is an emergency vehicle 24 in the vicinity. The user can then look for the emergency vehicle and move out of the way on the road to clear the path for the emergency vehicle 24. When the emergency vehicle 24 moves out of range of the vehicle 16 and thus the emergency warning signal is no longer received, the audible 54 and/or visual alert 56 will be deactivated.

Additionally, a manually activated transmission defeat switch 63 may be connected between the siren 64 and the transmitter 46. This switch may be opened to disconnect the siren 64 and the transmitter 46 thereby preventing transmission of a signal when the siren is on. This is ideal for a law enforcement vehicle 28 in situations where the law enforcement vehicle 28 is responding and does not want to make their presence known.

Figure 11:
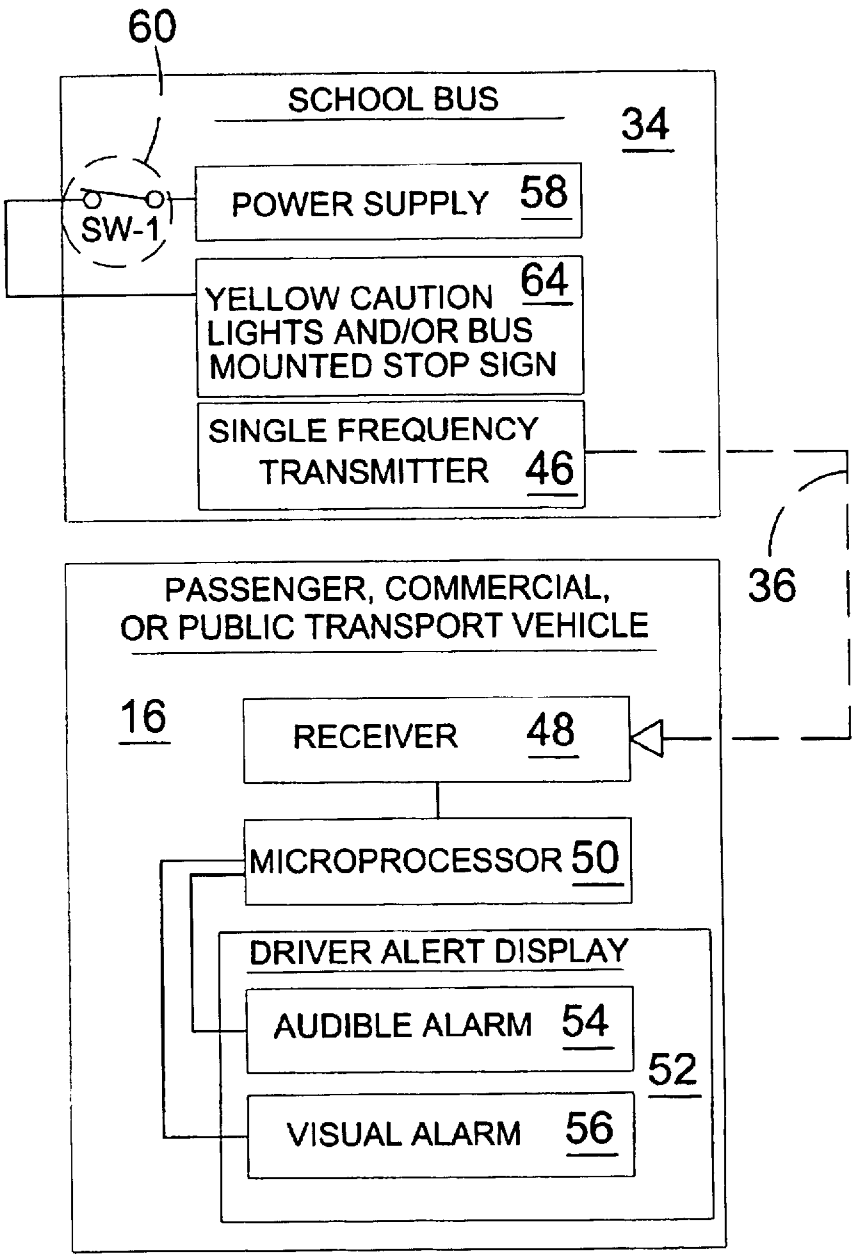
FIG. 11 is a block diagram showing a school bus transmitter transmitting warning data to the receiver in accordance with the vehicle speed and safety warning system of the present invention.

FIG. 11 is a block diagram of the vehicle speed and safety warning system of the present invention. This figure shows the interaction of the vehicle mounted receiver and display with a transmitter in a school bus. The school bus 34 has a power supply 58. The power supply 58 is connected to the caution lights 64 and/or bus mounted stop sign 65 by a first switch 60. The caution lights 64 and/or bus mounted stop sign 65 are connected to the transmitter. When the first switch 60 is in the open position, the caution lights 64 and/or bus mounted stop sign 65 are not activated. When the first switch 60 is in the closed position, the caution lights 64 and/or bus mounted stop sign 65 are activated and the transmitter 46 is connected to the power source 58. The connection of the transmitter 46 to the power supply 58 causes the transmitter to transmit a school bus warning signal 36. The school bus warning signal 36 is of a unique frequency.

The school bus warning signal 36 is received by the receiver 48 of the vehicle warning system 10 located in a vehicle 16 within a predetermined distance from the school bus 34. The receiver is tuned to receive each possible transmitted frequency at any time or the receiver may scan a range of frequencies until a signal is received. The frequency of the received signal is then determined. Upon receiving the school bus warning signal 36, the receiver 48 communicates with the microprocessor 50. The microprocessor 50 analyzes the school bus warning signal 36 and determines the signal was transmitted by a school bus. The microprocessor 50 signals the alert unit 52. The alert unit 52 is comprised of an audible alert 54 and/or a visual alert 56. Once activated, the audible alert 54 and/or the visual alert 56 signals the user in the vehicle that there is a school bus 34 is in the area. The user can then look for the school bus and move out of the way on the road to clear the path for the school bus 34 or the occupants thereof or at least be alerted that he may need to stop the vehicle should the school bus come to a stop to discharge passengers. When the school bus 34 is no longer picking up or discharging patrons the vehicle 16, the transmitter will cease transmitting the signal. When the vehicle 16 moves out of range of the school bus 34 and thus the emergency warning signal is no longer received, the audible 54 and visual alert 56 will be deactivated.

Figure 12:
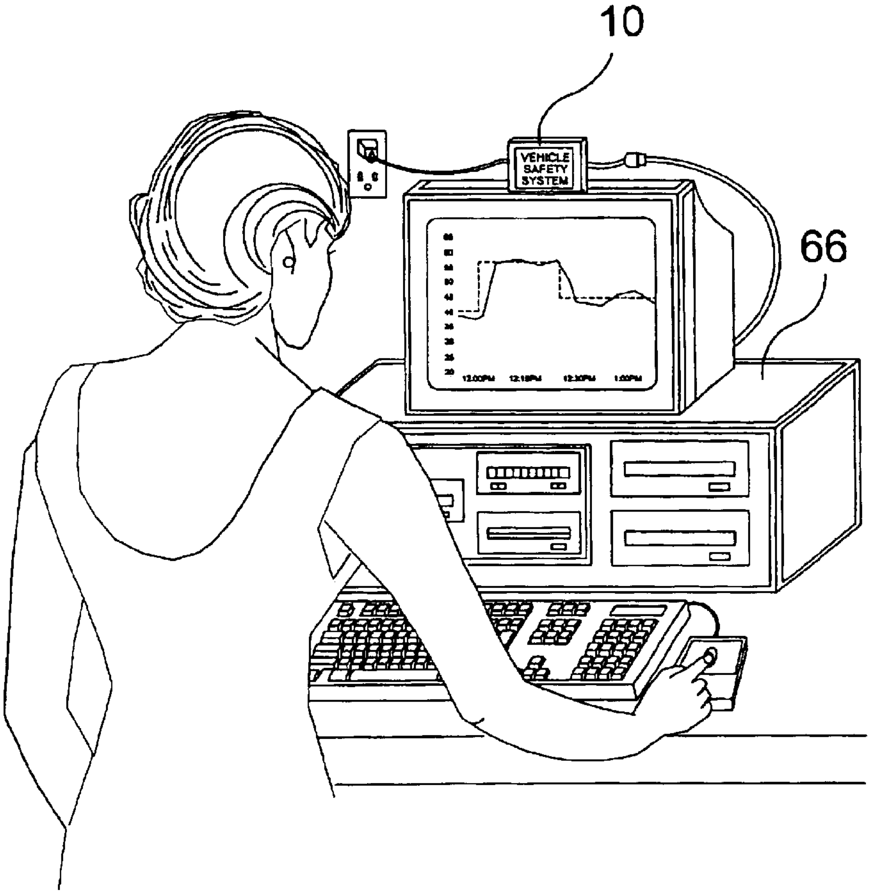
FIG. 12 is an illustrative view showing a user downloading data recorded by the vehicle speed and safety warning system of the present invention to a computer.

FIG. 12 is an illustrative view of a person downloading data recorded in the memory of the microprocessor of the vehicle speed and safety warning system to a computer. This is an additional feature that is in an alternative embodiment of the vehicle warning system 10. In this instance, the vehicle speed and safety warning system must be removably installed within a vehicle. Alternatively, a recording mechanism 68 may be detachably connected to the microprocessor 50. The recording mechanism 68 will record the vehicle speeds and posted speed limits thereon. The recording mechanism 68 records the actual speed and the posted speed over a set period of time. The removable recording mechanism 68 is then connected to a computer 66 via an input/output port and the data is transferred from the media to the computer 66. This feature is ideal for monitoring employee safe usage of company vehicles and the monitoring of student or adolescent drivers.

FIG. 13 is a block diagram of the vehicle speed and safety warning system of the present invention including a recording mechanism. The road sign or other traffic control device 14 has a transmitter 46 that transmits a unique speed warning signal 12. The speed warning signal 36 is of a unique frequency. The speed warning signal 12 is of a different frequency for each speed limit, whereby each 5 mile per hour interval is transmitted at a different frequency thereby identifying the speed represented by the transmitted frequency. Alternatively, the transmitter may transmit a data signal indicative of the posted speed limit that is analyzed upon receipt to determine the posted speed limit. The receiver 48 is tuned to receive each possible transmitted frequency at any time or the receiver 48 may scan a range of frequencies until a signal is received. The frequency of the received signal is then determined and thus the posted speed limit is detected. Alternatively, the transmitter 46 may transmit a data signal indicative of the posted speed limit that is analyzed upon receipt to determine the posted speed limit.

Upon receiving the speed warning signal 12, the receiver 48 provides the received signal to the microprocessor 50. The microprocessor 50 communicates with the recording mechanism 68 and sends the information about the posted speed to the recording mechanism 68. The microprocessor also monitors the current speed of the vehicle 16 and sends a signal representative of this information is also sent to the recording mechanism 68. The recording mechanism 68 records the signals indicative of the posted speed and current speed of the vehicle including a time and date stamp on a recording medium. The microprocessor 50 also monitors the speed of the vehicle 16, and if the speed of the vehicle 16 is greater than the posted speed as denoted by the unique speed warning signal 12, the microprocessor 50 signals the alert unit 52. The alert unit 52 also communicates with the recording mechanism 68 whereby the recording mechanism 68 records data indicative of each time the posted speed limit is less than the actual speed traveled. The alert unit 52 includes an audible alert 54 and/or a visual alert 56. Once activated the audible alert 54 and/or visual alert 56 inform the user in the vehicle that the speed of the vehicle 16 is greater than the posted area speed limit. The user can then slow down the appropriate speed. When the speed of the vehicle is reduced below the posted speed the audible 54 and/or visual alert 56 will be deactivated. The present invention increases safety on the road by providing means to alert users who do not realize their speed has increased past the allowed limit. At a user selected point, the data from the recording mechanism 68 can be transferred to a computer to be reviewed and analyzed.

FIG. 14 is a block diagram of the vehicle speed and safety warning system of the present invention. This figure shows the interaction of the vehicle mounted receiver and display with a transmitter in a sign or other traffic control device equipped for law enforcement purposes. The road sign or other traffic control device 14 has a transmitter 46 that transmits a unique speed warning signal 12. The speed warning signal 12 is of a different frequency for each speed limit, whereby each 5 mile per hour interval is transmitted at a different frequency thereby identifying the speed represented by the transmitted frequency. Alternatively, the transmitter may transmit a data signal indicative of the posted speed limit or traffic control device condition that is analyzed upon receipt to determine the posted speed limit.

A receiver 48 of the vehicle warning system 10 located in the vehicle 16 is tuned to receive each possible transmitted frequency at any time or the receiver may scan a range of frequencies until a signal is received. The frequency of the received signal is then determined and thus the posted speed limit is detected. Alternatively, the transmitter may transmit a data signal indicative of the posted speed limit or other traffic control device that is analyzed upon receipt. Upon receiving the warning signal 12, the receiver 48 communicates with the microprocessor 50. The microprocessor analyzes the received signal to determine the posted speed limit or other traffic control device condition.

In the presence of a speed warning signal 12, the microprocessor 50 monitors the speed of the vehicle 16. If the speed of the vehicle 16 is greater than the posted speed as denoted by the unique speed warning signal 12, the microprocessor 50 then signals a transponder 78. The transponder emits a transponder signal 76 that is then received by a receiver 70 on the road sign 14. The signal transmitted by the transponder 76 includes data representative of the speed of the vehicle and a signal indicating the vehicle is traveling above the posted speed limit. The sign receiver 70 communicates with a sign microprocessor 72 upon receiving the transponder signal 76. The sign microprocessor 72 then activates a camera or other data recording device 74. The camera or other data recording device 74 is controlled to take a picture of the license plate and/or record the VIN of the vehicle 16 from which the transponder signal has been received. The vehicle microprocessor 50 also signals an alert unit 52 when the actual vehicle speed is greater than the posted speed. The alert unit 52 is comprised of an audible alert 54 and/or a visual alert 56. Once activated the audible alert 54 and/or the visual alert 56 inform the user in the vehicle that the speed of the vehicle 16 is greater than the posted area speed limit. The user can then slow down the appropriate speed whereby the at least one of the audible 54 and visual alert 56 will deactivate.

Equally, in the occurrences of another traffic control device such as a traffic light 12, the microprocessor 50 monitors the possible infraction of the vehicle 16. If the vehicle 16 proceeded through a red traffic light and infracts the stop signal 12, the microprocessor 50 then signals a transponder 78. The transponder emits a transponder signal 76 that is the received by a receiver 70 on the traffic control device 14. The signal transmitted by the transponder 76 includes data representative of the vehicle and a signal indicating the vehicle has committed a traffic infraction. The traffic control device receiver 70 communicates with a traffic control device microprocessor 72 upon receiving the transponder signal 76. The traffic control device microprocessor 72 then activates a camera or other data recording device 74.

The camera or other data recording device 74 is controlled to take a picture of the license plate and/or record the VIN of the vehicle 16 from which the transponder signal has been received. The vehicle microprocessor 50 also signals an alert unit 52 when the vehicle has committed an infraction. The alert unit 52 is comprised of an audible alert 54 and/or a visual alert 56. Once activated the audible alert 54 and/or the visual alert 56 inform the user in the vehicle that the user committed a traffic infraction. This embodiment allows for more efficient enforcement of basic traffic laws, thereby increasing the safety of the roads.

The operation of the vehicle speed and warning safety system of the present invention will now be discussed. A vehicle 16 can be equipped with the vehicle warning system 10 at time of manufacture, or can be added to a vehicle 16 that had been previously manufactured. A vehicle warning unit is installed in the vehicle including a receiver 48, a microprocessor 50 and a display 20. A unit including a transmitter may be installed in vehicles including but not limited to law enforcement vehicles, emergency vehicles, school busses and trains. The units installed in such vehicles include a transmitter able to transmit a signal at a predetermined frequency able to be received by the receiver installed with a vehicle unit. The signal transmitted by these units will indicate the presence of such vehicles so users of other vehicles equipped with receiver units can be notified of their presence.

In order to set up the system for operation, a transmitter is also positioned on a road sign 14. The road sign transmitter 46 is programmed to transmit a unique speed warning signal 12. The speed warning signal 12 is of a different frequency for each speed limit. The speed warning signal 12 is of a different frequency for each speed limit, whereby each 5 mile per hour interval is transmitted at a different frequency thereby identifying the speed represented by the transmitted frequency. Alternatively, the transmitter may transmit a data signal indicative of the posted speed limit that is analyzed upon receipt to determine the posted speed limit. The transmitter may constantly transmit the speed warning signal. Alternatively, the transmitter may include a proximity or motion sensor to indicate when a vehicle is approaching and transmit a signal when the vehicle is detected.

When a vehicle approaches a sign including a transmitter, the transmitted signal is received by the receiver 48 of the vehicle warning system 10 located in the vehicle 16. The receiver 48 of the vehicle warning system 10 located in the vehicle 16 is tuned to receive each possible transmitted frequency at any time or the receiver may scan a range of frequencies until a signal is received. The frequency of the received signal is then determined and thus the posted speed limit is detected. Alternatively, the transmitter may transmit a data signal indicative of the posted speed limit that is analyzed upon receipt to determine the posted speed limit. Upon receiving the speed warning signal 12, the receiver 48 communicates with the microprocessor 50. The microprocessor analyzes the received signal to determine the posted speed limit. The microprocessor 50 also monitors the speed of the vehicle 16. If the speed of the vehicle 16 is greater than the posted speed as denoted by the unique speed warning signal 12, the microprocessor 50 then signals the alert unit 52. The alert unit 52 is comprised of an audible alert 54 and/or a visual alert 56. Once activated the audible alert 54 and/or the visual alert 56 inform the user in the vehicle that the speed of the vehicle 16 is greater than the posted area speed limit. The user can then slow down to the appropriate speed whereby the audible 54 and/or visual alert 56 will deactivate.

The receiver unit in the vehicle may also include a recording mechanism 68 connected to the microprocessor 50 and the alert unit 52. The microprocessor 50 communicates the actual speed of the vehicle 16 to the recording mechanism 68, and also communicates the posted speed as received from speed warning signals 12 from road signs. The recording mechanism 68 can then be removed from the vehicle 16 and connected to a computer 66 where the data can be downloaded and analyzed.

The vehicle speed and warning system of the present invention can also be used in conjunction with trains 30, school buses 34, emergency vehicles 24, or law enforcement vehicles 28. These vehicles transmit independent unique signals that are received by a vehicle 16. The receiver 48 of the vehicle 16 receives the signals emitted by the above mentioned vehicles. The microprocessor 50 of the vehicle 16 translates the signals and communicates with the alert unit 52 of the vehicle. The alert unit 52 is comprised of an audible alert 54 and/or a visual alert 56. The user is then made aware of the presence of the vehicle. Upon determining the location of the vehicle, the user may then move out of the path of the vehicle, as in the case of the emergency vehicle 24, or stop in the case of the train 30, law enforcement vehicle 28, or school bus 34. When the train 30, school bus 34, law enforcement vehicle 28, or emergency vehicle 24 has passed the audible 54 and/or visual alert 56 will be deactivated.

From the above description it can be seen that the vehicle speed and safety warning system of the present invention is able to overcome the shortcomings of prior art devices by providing a vehicle speed and safety warning system which is able to caution drivers by transmitting posted speed limit data over a specific radio frequency to vehicles within a predetermined range that are equipped with compatible receivers. The vehicle speed alert system includes a transmitter connected to traffic signs and a receiver and audible and/or visual alarms installed within vehicles for receiving a transmitted signal and informing the driver of unsafe road conditions, posted speed limits and travel at excessive speeds. The system is able to record the actual speed of a vehicle as well as a posted speed limit indicated by the received signal. The system may also include transmitters installed in emergency vehicles for transmitting a signal indicating the emergency vehicle is in the immediate area. The system may further include school buses equipped with transmitters for transmitting location data over a specific radio frequency to vehicles within a predetermined range that are equipped with compatible receivers. Furthermore, the vehicle speed and safety warning system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A vehicle speed and safety system, said system comprising:

a) a stationary transmitting device positioned on a side of a road for generating and transmitting a signal indicative of a speed limit for a respective portion of the road said signal being transmitted at a different frequency for each different posted speed limit; and b) a unit positioned within a vehicle, said unit including:

i) a receiver for receiving the signal indicative of a speed limit transmitted by said transmitting device, said receiver scanning a range of frequencies until a signal is received;

ii) a microprocessor for analyzing said received signal to determine the speed limit represented by said signal, monitoring a speed of the vehicle and comparing said determined speed limit to the monitored speed; and iii) display means connected to said microprocessor for generating an alarm signal upon receipt of a signal from said microprocessor indicating the monitored speed exceeds the speed limit.

2. The vehicle as recited in claim 1, further comprising a transmitting device installed within said vehicle, said transmitting device transmitting a signal indicative of traffic law infraction and vehicle identification data, said stationary transmitting device having means for receiving said signal transmitted from said transmitting device within said vehicle and activating a camera mounted on said stationary transmitting device to take a picture of a license plate of said vehicle when a traffic infraction is recorded.

3. The system as recited in claim 1, wherein each frequency at which said signal indicative of a speed limit is transmitted represents a 5 mile per hour group of speed limits.

4. The system as recited in claim 1, wherein said display means includes at least one of an audio signal generator and a video display.

5. The system as recited in claim 4, further comprising a transmitting device installed within a school bus, said transmitting device transmitting a signal indicative of the presence of the school bus.

6. The system as recited in claim 4, wherein said transmitting device installed within an emergency vehicle, said transmitting device transmitting a signal indicative of the presence of the emergency vehicle.

7. The system as recited in claim 6, wherein said transmitter includes a switch for manually enabling/disabling transmission of said signal.

8. The system as recited in claim 4, wherein said transmitting device installed within a train, said transmitting device transmitting a signal indicative of the presence of the train.

9. The system as recited in claim 4, wherein said transmitting device installed within a law enforcement vehicle, said transmitting device transmitting a signal indicative of the presence of the law enforcement vehicle.

10. The system as recited in claim 9, wherein said transmitter includes a switch for manually enabling/disabling transmission of said signal.

11. The system as recited in claim 5, wherein said transmitting device is activated upon activation of flashing lights and/or stop signs mounted on the school bus.

12. The system as recited in claim 6, wherein said transmitter is activated upon activation of a siren on said emergency vehicle.

13. The system as recited in claim 9, wherein said transmitter is activated upon activation of a siren on said law enforcement vehicle.

14. The system as recited in claim 1, wherein said unit further includes a recording device connected to said microprocessor for recording a determined speed limit, a monitored speed of the vehicle and a signal indicative of a determination by said microprocessor that the vehicle is traveling at a speed greater than the determined speed limit.

15. The system as recited in claim 14, wherein said recording device further records the VIN (vehicle identification number) with the data recorded and whereby said data recorded by said recording device is downloadable to a computer.

16. The system as recited in claim 14, wherein said recording device is detachably connected to said unit whereby data recorded by said recording device is downloadable to a computer.

17. The system as recited in claim 2, wherein said receiving means includes a receiver, microprocessor and data recording device.

18. The system as recited in claim 17, wherein the data recording device records a VIN number of a vehicle of a speed greater than the signal indicative of a speed limit for a respective portion of the road.

* * * * *